United States Patent [19]

De Belder et al.

[11] 3,796,916
[45] Mar. 12, 1974

[54] X-RAY IMAGE VIEWER

[75] Inventors: Maurice Hector De Belder, Mechelen; Romain Henri Bollen, Hove; Luc Yves Natens, Berchem, all of Belgium

[73] Assignee: Agfa-Gevaert N.V., Mortsel, Belgium

[22] Filed: Jan. 12, 1971

[21] Appl. No.: 105,923

[30] Foreign Application Priority Data
Jan. 12, 1970 Great Britain...................... 1469/70

[52] U.S. Cl.................... 315/151, 355/37, 315/312
[51] Int. Cl. ........................................... H05b 37/02
[58] Field of Search ........ 315/151; 355/37, 35, 113, 355/88

[56] References Cited
UNITED STATES PATENTS

| | | | |
|---|---|---|---|
| 3,110,761 | 11/1963 | Allen et al. ........................ | 355/35 X |
| 3,217,594 | 11/1965 | Simmon ............................ | 355/35 X |
| 3,227,044 | 1/1966 | Hunt et al. ........................ | 350/317 X |
| 3,322,025 | 5/1967 | Dauser .............................. | 355/35 X |
| 3,627,908 | 12/1971 | Dailey .............................. | 355/37 X |
| 2,885,564 | 5/1959 | Marshall, Jr. ..................... | 307/299 |
| 3,198,980 | 8/1965 | Martin ............................. | 315/151 X |
| 3,247,390 | 4/1966 | Kazan .............................. | 315/151 X |

*Primary Examiner*—Nathan Kaufman
*Attorney, Agent, or Firm*—William J. Daniel

[57] ABSTRACT

An X-ray viewer for coloured radiographic images. The apparatus comprises two groups of light sources with different colour temperature. The current through the groups can be progressively varied so as to increase or decrease the amount of irradiating light which lies in part of the visible spectrum which is complementary to the predominating wavelength in the image colour. The variation in the spectral composition causes no substantial change in the illumination of the image.

4 Claims, 4 Drawing Figures

X-RAY IMAGE VIEWER

This invention relates to light projection apparatus for use in recording or viewing transparent coloured photographic and radiographic images.

If a said transparent image consists of or includes juxtaposed areas of the same colour but different colour density, the image details represented by the colour density difference are sometimes insufficiently clear when the image is recorded or viewed by means of transmitted light.

It is an object of the invention to provide for modification of the visual contrast of such images.

According to the present invention, a light projecting apparatus is used for projecting light through a transparent coloured image having at least one part which comprises juxtaposed areas of the same image colour but different colour density, said apparatus comprising a diffusing screen, a light source or light sources arranged for illuminating said screen substantially uniformly, means whereby the spectral composition of the light irradiating the screen can be progressively varied over a variability range at one end of which the irradiating light lies in that part of parts of the visible spectrum which is or are complementary to the part or parts of such spectrum containing the wavelengths or the predominating wavelengths forming the irradiating light at the other end of such range, and means which maintains the illumination of the screen substantially constant during such variation of the spectral composition of the irradiating light.

In the foregoing definition, the term "image colour" means the colour of the light transmitted by the image or image part in question when it is irradiated with white light, and the term "irradiating light" means the light incident upon the specified image or image part.

In order to permit the visual contrast to be increased to an appreciable extent it is preferred to design the system so that an one end of the variability range the composition of the irradiating light is at least mainly in the said complementary part of parts of the visible spectrum. Optimally, at that end of the variability range the composition of the irradiating light is entirely of substantially entirely in such complementary part or parts of the spectrum. In order to achieve a wide contrast variability range it is preferred to design the system so that at the other end of the variability range the amount of irradiating light which lies in said complementary part or parts of the visible spectrum is nil or substantially so, or at least is less than the amount of irradiating light which is in the other part or parts of the visible spectrum.

For the purposes primarily in view it is important for the control system to be designed so that the progressive variation in the spectral composition of the irradiating light can be instantly terminated at any point within the total variability range.

The variation in the spectral composition of the irradiating light can, e.g., be achieved by using light sources the light emissions of which are wholly or mainly in different spectral bands and can be simultaneously varied in intensity in opposite sense, or by means of differently coloured light-reflecting surfaces which are displaceable and/or can be selectively masked for achieving the required variation in spectral composition in respect of the total reflected light, this being used for irradiating the transparent image.

The illumination of the image or image part which is subject to visual contrast variation may be kept constant during such variation by means of at least one photosensitive device influencing the output of the light source or light sources in response to any variation in the intensity of the irradiating light.

As the invention has been made primarily with a view to aiding the inspection of transparent monochrome or polychrome images, and particularly monochrome X-ray images, the invention will be hereinafter described more specifically in that context. It will be evident however that if a given modification of the spectral composition of the irradiating light improves the visual contrast of the image, the same modification will enable the image details to be recorded with improved contrast if the transmitted light is used for recording or copying the image on radiation-sensitive material.

In order to achieve a substantially homogeneous spectral composition of the irradiating light for all settings within the variability range it is desirable to interpose a light mixing device or devices between the light source or sources and the transparent image. For viewing transparent images by transmitted light it is preferred to use a light mixing device in the form of a diffusing screen. Preferably the apparatus employed includes means for holding a said transparent image against the diffusing screen.

The apparatus employed may be designed for illuminating the whole of an exposed and developed film or "plate" as conventionally used in medical radiography or for illuminating two or more such films or plates simultaneously. The means for varying the spectral composition of the irradiating light can be effective over the whole of the viewing area or over only a limited zone within that area. In the latter case the visual contrast of any selected part of an image can be varied provided the film or plate is located with that part of the image in the variability zone. One or more shutters or masks may be provided for masking any part of an image which at any given time does not need to be inspected.

Depending on the extent of the viewing area over which the contrast variability is to be effective it may be desirable to provide a plurality of light sources in a plane substantially parallel with the viewing plane (the plane of the irradiated image). For illuminating a given viewing area substantially uniformly, the depth of the space occupied by the apparatus, measured from the viewing plane to the light sources can then be small in comparison with the depth of space required if only one light source is used.

As applied to monochrome radiographic image viewing systems, the invention gives particularly good results in the case that the radiographic image is in the blue-cyan colour range and the irradiating light can be varied over a range at one end of which the irradiating light is composed wholly or predominantly of wavelengths within the said range blue-cyan, e.g., is substantially the same colour as the image or is of neutral colour, and at the other end of which variability range the irradiating light is wholly or mainly composed of wavelengths in a band or bands of the spectrum complementary to the band or bands containing the wavelengths or the predominating wavelengths in the said image colour; for example at the said other end of the variability range, the irradiating light may be yellow or in the orange-red colour range. When the irradiating light is in that colour range the visual contrast of the irradiated image is improved, particularly in the case of low density areas.

An apparatus for carrying out the invention will now be described with reference to the accompanying diagrammatic drawings.

Figure 1:
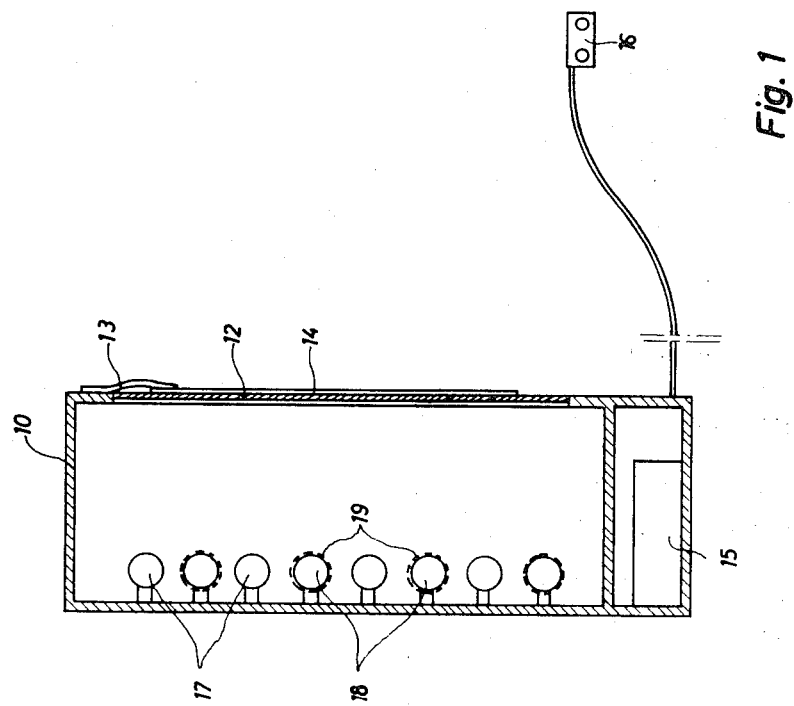
FIG. 1 is a diagrammatic view of an apparatus according to the invention.

FIG. 1 shows a radiographic film viewer comprising a housing 10, a plurality of parallel electroluminescent gas discharge tubes 17 and 18, a diffusing screen 12, a clip 13 fitted to the housing of the apparatus for holding a radiographic film sheet 14 against the screen, an electronic control circuit 15 located in the lower part of the housing, and a remote control 16 with a first knob for setting the overall-luminance of the viewer and a second one for controlling the spectral composition of the light.

The electroluminescent tubes are divided into two arrays, one array comprising the tubes 17 and the other array comprising the lamps 18. The tubes 17 produce white light of high colour temperature whereas the tubes 18 are in fact the same kind of tubes with low colour temperature which additionally are provided with a tubular envelope 19 formed by a triacetate sheet on which an orange filter layer has been coated.

Figure 2:
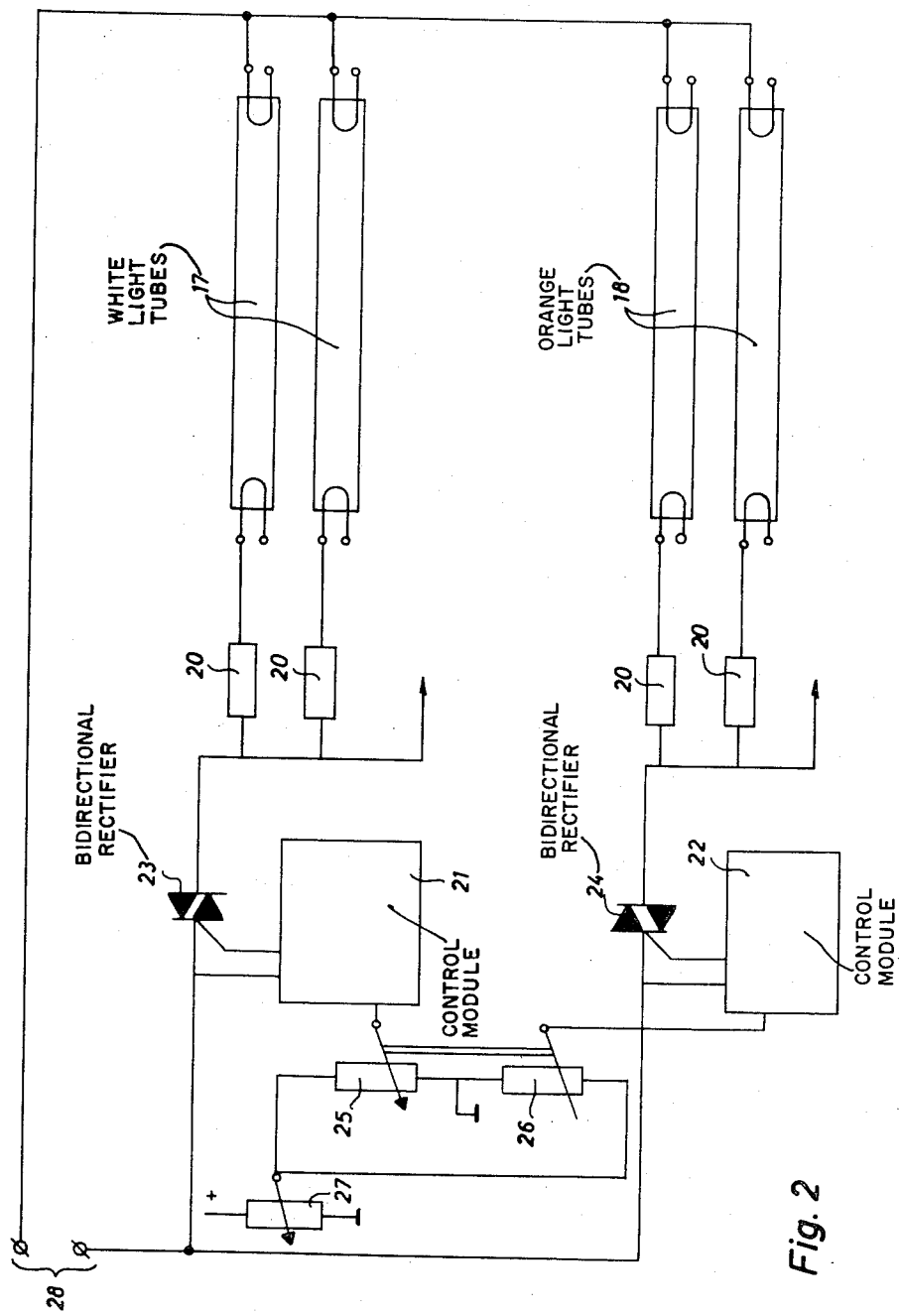
FIG. 2 is the electronic circuit for controlling the apparatus according to FIG. 1.

The electronic circuit 15 for controlling the tubes is shown diagrammatically in FIG. 2. It comprises the arrays of tubes 17 and 18, each tube having its own choke 20 in series therewith, the control modules 21 and 22, the bi-directional SCR 23 and 24, the potentiometers 25-26 and 27 which are located in the remote control box 16 which is connected through a flexible cable with the electronic circuitry, and a connection 28 to an A.C. mains supply.

The apparatus comprises also a mains transformer, not shown in the drawing, having a plurality of secondary windings onto which the different filaments at one side of the discharge tubes are connected individually, The filaments at the other side of the tubes may be connected in parallel to one secondary winding of the transformer. The voltage of one secondary of the transformer is rectified, stabilised, and used as a D.C. potential from which the adjustment potential for the control modules is derived by means of the potentiometers 25-26 and 27.

The control modules 21 and 22 provide a pulsating output signal for driving the bi-directional SCR 23 and 24 into the conductive state, the width of the pulses of the signal being proportional to the magnitude of the D.C. potential applied to the input of the control modules.

The input voltage of the control modules, and thus the luminance of all the tubes, is in the first place determined by the setting of the potentiometer 27, since a variation in the said setting influences in the same sense the two control modules.

In a second way, the input voltage of the modules is determined by the setting of the potentiometers 25 and 26 which are mechanically coupled with each other, and which are electrically connected in such a way that the output voltage at one slider decreases in correspondence with an increase of the voltage at the slider of the other potentiometer. In the mentioned way, a change in the luminance of the tubes 17 is always opposite to a change in the luminance of the tubes 18, and thus the potentiometers 25 and 26 permit to change the spectral composition of the produced radiation gradually from white to orange, the overall luminance of the irradiating light remaining substantially constant.

Although the behaviour of the bi-directional SCR in connection with the control modules is not strictly linear and the light output of the tubes is also not a strict linear function of the applied current, it has been shown that deviations of the overall luminance of the irradiating light remain within 10 percent. A deviation of this order of magnitude is not perceptible for the operator working with the apparatus, and therefore no additional correcting means is required to keep the luminance constant within closer limits.

However, the parallel connection of the electroluminescent tubes can give rise to non uniform luminance distribution, especially when operating them at low light levels.

In case it is yet required to keep the luminance constant within close limits, or if the spectral composition of the two groups of tubes is such that the impression of a constant luminance cannot be obtained, a photoelectric cell may be provided which measures the luminance of the viewing screen or of a part thereof and which controls the overall luminance of the tubes. In a most simple embodiment, a photodiode may be inserted in series between the potentiometer 27 and the ground, so that a decreased light output causes the resistance of the photocell to increase and thereby the potential at the slider of the photentiometer to increase correspondingly, and vice versa.

Figure 3:
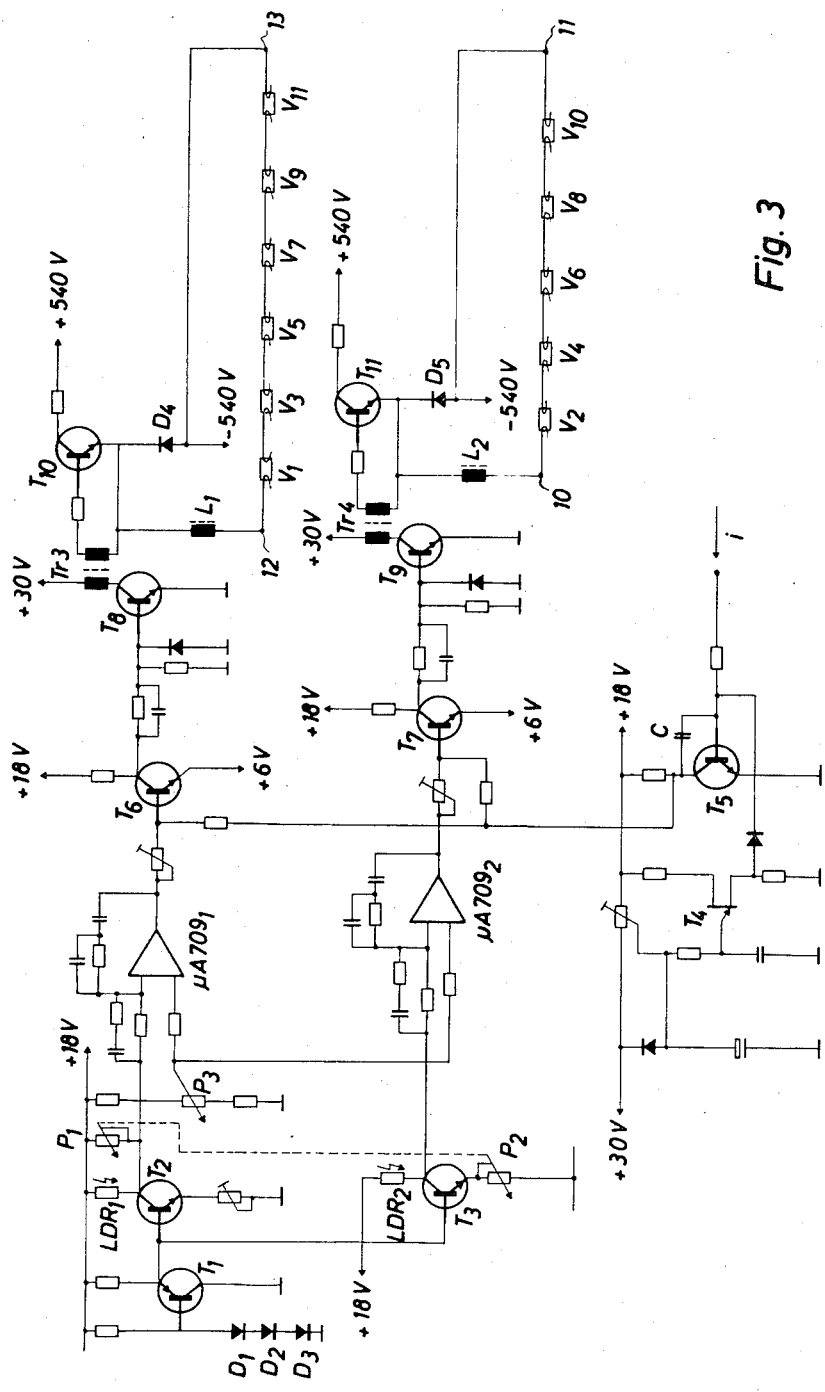
FIG. 3 shows a circuit for controlling the current through tubes V1 to V11.

In FIG. 3 is shown an improved electronic circuit for controlling the current through electroluminescent tubes V1 and V11. The tubes are divided into two groups, the tubes of each group now being fed in series, so that the light intensity is uniform all over the viewer. Indeed, the light emission of an electroluminescent tube is primarily dependent on the temperature of/and the current through the tube. Six tubes V1, V3, V5, V7, V9 and V11, e.g. of the commercially available Sylvania lamp type F 15 T 8-WW are used which emit light in the orange-red colour range. These lamps are tubelike low pressure mercury lamps with a nominal power of 20 W and a low equivalent colour temperature. Alternately to said tubes five further tubes V2, V4, V6, V8 and V10 of the type F 15 T 8-D also commercially available from Sylvania, are positioned having same sizes and nominal power as the foregoing tubes however with a high equivalent colour temperature. Moreover, tubelike selective filters which e.g. absorb all wavelengths under 570 nm are provided around the tubes V1, V3, V5, V7, V9 and V11.

To avoid disturbing ripple on the light flux of the tubes at low frequency, say in the order of magnitude of 50-100 Hz, the tubes are fed with DC pulses of 540 V at e.g. 16 kHz so that equally no nuisance originating from disturbing acoustical noise effects is encountered. The width of the pulses is modulated according to the desired luminous flux as will be further exposed hereinafter.

Figure 4:
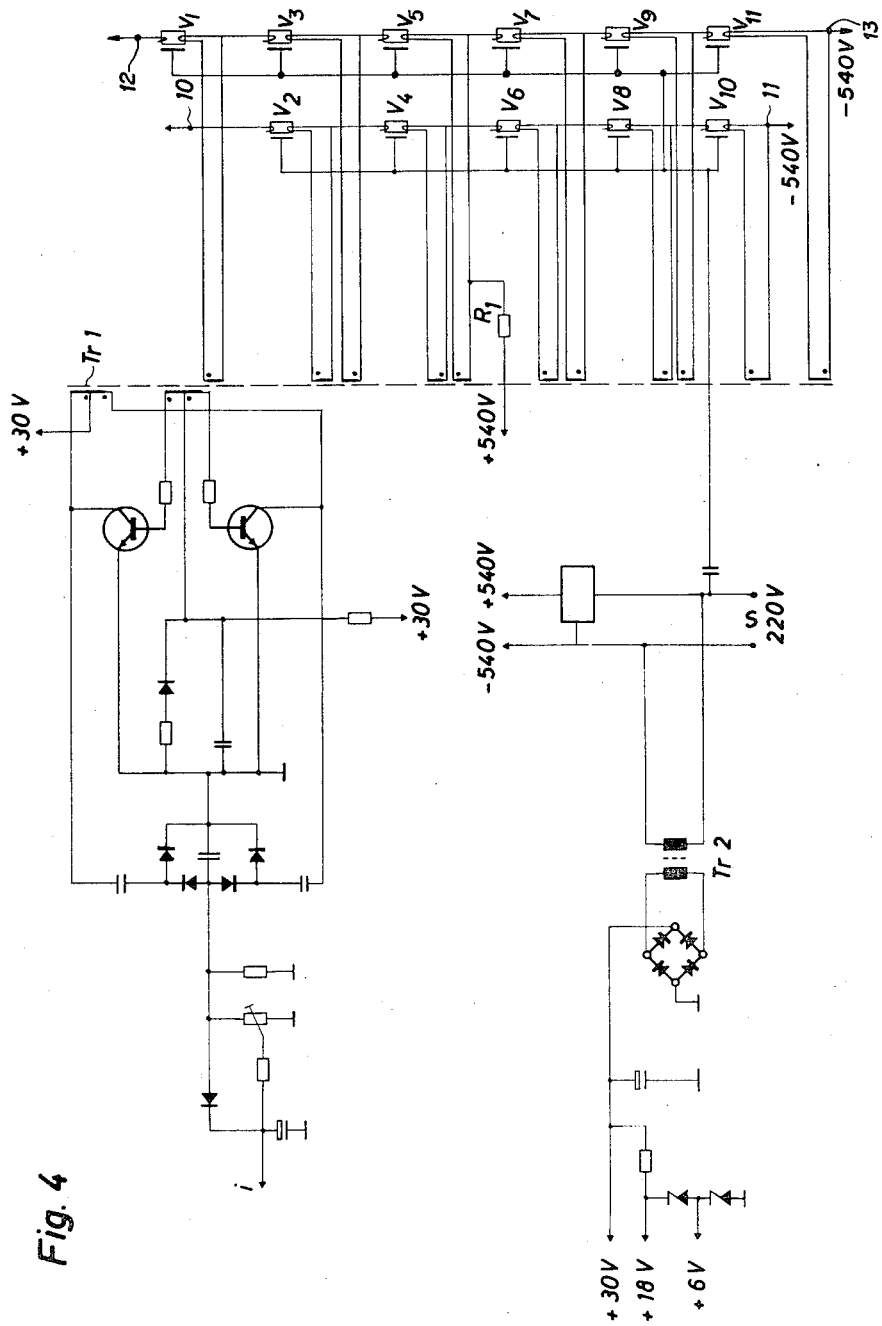
FIG. 4 shows a power supply for the circuit of FIG. 3.

Since the tubes are fed with D.C. only the cathode filament of each tube has to be heated. As the cathodes of the various tubes have differing DC potentials the cathode filaments of the tubes are each fed by an individual winding on a high-frequency transformer which is itself fed by a separate transistor oscillator of e.g. the balanced converter type. The diagram of FIG. 4 shows the heater current transformer Tr1. Here the heater current windings are formed by three windings of connecting wire around the ferrite core of the transformer Tr1.

On the tubes V1 and V11 ignition strips are provided which as illustrated in FIG. 4 are connected via a capacitor with the so-called "hot" side of the A.C-mains terminals. For assuring the ignition of the set of tubes V1, V3, V5, V7, V9 and V11 the anode of tube V7 is connected with the 540 V terminal over a resistor R1 in the order of magnitude of 1 M $\Omega$. Hence full voltage is given to the tubes V11, V9 and V7 at the ignition, so that these three tubes will positively ignite. Thereupon tubes V5, V3 and V1 will ignite quite safely.

The DC-voltage of 540 V may be obtained in a very simple way by doubling the AC-voltage of 220 V by means of a diode-capacitor pump circuit. Occasionally said voltage may be stabilized by means of a silicon controlled rectifier (SCR). In case of a 117 V-AC mains a voltage quadruplication may be applied. For reaons of safety the low voltage is obtained by means of a transformer Tr2.

The control circuitry of each of the coloured light sources of the viewer system, consists essentially of a set of potentiometers, determining the desired colour and/or luminance, of a measuring photocell resistor bridge, a PID controller, a pulse width modulator and a switching power regulator, feeding current to the respective groups of tubes. The photocells are biased through current sources T2 and T3. Their current value is given by the voltage drop over forward biased diodes D1, D2, D3, the presence of which will be referred to later on.

The control errors are measured between the nodes of two bridges :
the first one consisting of LDR1, T2 and the potentiometric divider containing P3, the second one consisting of LDR2, T3 and the same potentiometric circuit.

The errors are fed to the operational amplifiers $\mu$A 709 1/2, connected onto a PID controller mode.

The output signal of the $\mu$A 709 1/2 is further compared with the output signal of a miller-integrator T5 delivering a sawtooth voltage. The miller-integrator is fed with a constant current $i$ which is derived from the balanced converter of FIG. 4. In this way the miller-integrator only runs when the filaments are heated. The capacitor C is periodically discharged through the unijunction transistor T4 delivering needle pulses with a frequency of e.g. 20 kHz. The comparator transistors t6/T7 deliver pulses which are modulated in width by the output signal of the $\mu$A 709 1/2. These pulses are further amplified by the transistors T8/T9 and passed through a transformer Tr3/Tr4 to the basis of high voltage transistors T10/T11 which control the current through the series connection of the tubes V1, V3, V5, V7, V9 and V11/V2, V4, V6, V8, V10. Further a choke L1/L2 in series connected with said tubes is arranged for maintaining the current passing through the tubes to a substantially constant value and between the emitter of T10/T11 and the negative terminal of the high voltage source (−540 V) a free wheel diode D4/D5 is connected which is conductive during the moments transistor T10/T11 is blocking.

Resistor LDR1 and LDR2 and potentiometer P1 and P2 are thus measured that the subjective contrast of a standard transparency varies linearly as a function of the angular position of P2.

The layout of the circuit is so that rotating the potentiometer axis in one direction increases the light intensity of one series connection of tubes and decreases at the same time the light intensity of the other series connection.

The base drivers of the current sources T2 and T3 are determined by the forward voltage drop accross the diodes D1 to D3. This voltage drop is temperature dependent and compensates for the temperature coefficient of the photoresistors. Said voltage drop determines the emitter voltage of T1 and thereby the base currents of T2 and T3.

The total light intensity can further be set by means of P3 which is connected between the terminals of the low voltage supply (18 V). The slider of this potentiometer is connected to the reference inputs of the operational amplifiers $\mu$A 709 1/2 respectively. The total light emission of both groups of tubes is made independent of the setting of the potentiometers P2 and P3 by choosing the correct component values.

Various other forms of apparatus can be used for carrying out the invention. For example, the required colouration of the coloured reflecting surfaces and the colour variation can be achieved by displacing, e.g. pivoting, such surfaces in relation to the light source or sources, or by providing one or more movable reflectors which can be displaced in relation to the light source or sources for directing light from such source or sources onto one or another of such reflecting surfaces or onto both or all of them in predetermined proportions determined by the position of the reflector or reflectors. Such coloured reflecting surfaces may be, e.g., inner surfaces of the housing or lamp box.

While the viewing of monochrome images has been more particularly referred to, it will be apparent that the invention can be usefully applied in systems for viewing polychrome images. By providing light sources emitting irradiating light in different spectral bands complementary to those of the different image colours and enabling such different light sources to be used independently, the contrast within image areas of any given colour can be enhanced at will by switching to the appropriate colour of irradiating light.

We claim:

1. Light projecting apparatus for projecting light through a transparent image having a color predominantly within a given region of the visible spectrum and composed at least in part of juxtaposed image areas in which said color varies in color density, said apparatus comprising:
    a. two groups of electro-luminescent tubes, one group emitting light in a first spectral region containing the predominant color region of said image and the other group emitting light in a second spectral region substantially complementary to said predominant color region of said image,
    b. a diffusing screen for mixing the light emitted by said two groups of tubes to illuminate the said transparent image substantially uniformly,
    c. means for progressively varying the electric currents through the respective two groups of tubes in inverse proportion to one another to thus progressively vary the spectral composition of said illuminating light between said first and said second spectral region, and d. means for controlling the overall intensity of the emitted light to keep the intensity of illumination of the transparent image substantially constant independently of the variation of the spectral composition of the illuminating light between said first and said second spectral region.

2. Light projecting apparatus according to claim 1 comprising at least one photoelectric cell for measuring the intensity of the emitted light and for controlling the current through at least one group of electroluminescent tubes to keep the overall intensity of the emitted light substantially constant.

3. Light projecting apparatus according to claim 2 comprising a control amplifier with differential inputs, one input receiving an electric signal corresponding with the setting of said means for progressively varying the electric current through the two groups of tubes, and the other input receiving an electric signal corresponding to a predetermined level of overall intensity of illumination.

4. Light projecting apparatus according to claim 3 comprising an electric circuit for producing an electric signal having a saw-tooth pattern, and means for comparing said saw-tooth signal with the output signal of said controlling amplifier, the electric signal resulting from said comparison controlling an amplifier stage which produces a pulse width modulated output signal for controlling the current through said electroluminescent tubes, the frequency of said output signal corresponding with the frequency of said sawtooth signal, and the pulse width of said output signal depending on said electric comparison signal.

* * * * *